Nov. 1, 1955 H. KRAUSE 2,722,136
EMERGENCY BRAKES AND RELEASES THEREFOR
Filed Oct. 8, 1952 2 Sheets-Sheet 1

Inventor
Herbert Krause
by Parker & Carter
Attorneys

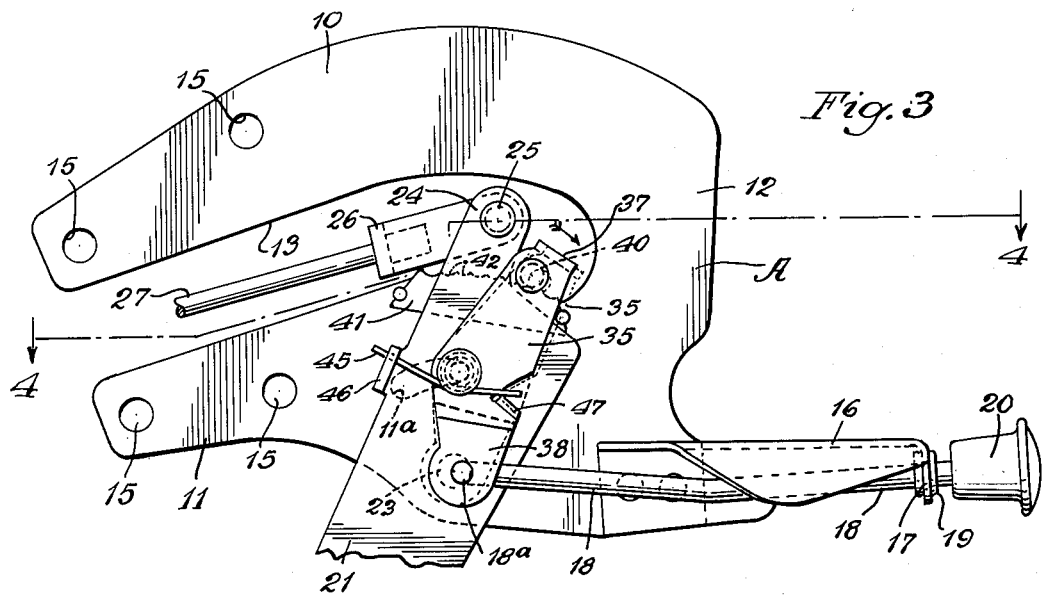

United States Patent Office 2,722,136
Patented Nov. 1, 1955

2,722,136

EMERGENCY BRAKES AND RELEASES THEREFOR

Herbert Krause, Chicago, Ill., assignor to Chicago Forging and Manufacturing Company, Chicago, Ill., a corporation of Delaware Application October 8, 1952, Serial No. 313,664

5 Claims. (Cl. 74—539)

My invention relates to locking and release mechanisms for brakes and the like, such as emergency brakes for automobiles. Experience has taught that prior mechanisms for this purpose were such that if a sufficiently secure locking device were provided, the release therefor was cumbersome and erratic in operation and required the exertion of considerable force in the movement of the release control member a considerable distance. Accordingly, it is one purpose of my invention to provide a mechanism which will be effective to securely lock brakes and the like and which will none the less be easily released by exertion of minimum force in the movement of a release control member over the shortest possible distance.

Another purpose is to provide a locking and release mechanism so constructed that portions thereof automatically take up for wear or variations in size and shape specifications incidental to assembly line practice.

Another purpose is to provide a locking and release mechanism which is easy to manufacture and requires a minimum of individual parts.

Other purposes will appear from time to time in the course of the specification and claims.

My invention is illustrated more or less diagrammatically in the accompanying drawings, wherein:

Figure 3 is a view similar to Figure 2, illustrating the parts in a different position;

Figure 4 is a section on the line 4—4 of Figure 3; and

Figure 5 is a section on the line 5—5 of Figure 2.

Like parts are indicated by like symbols throughout the specification and drawings.

Figure 2:
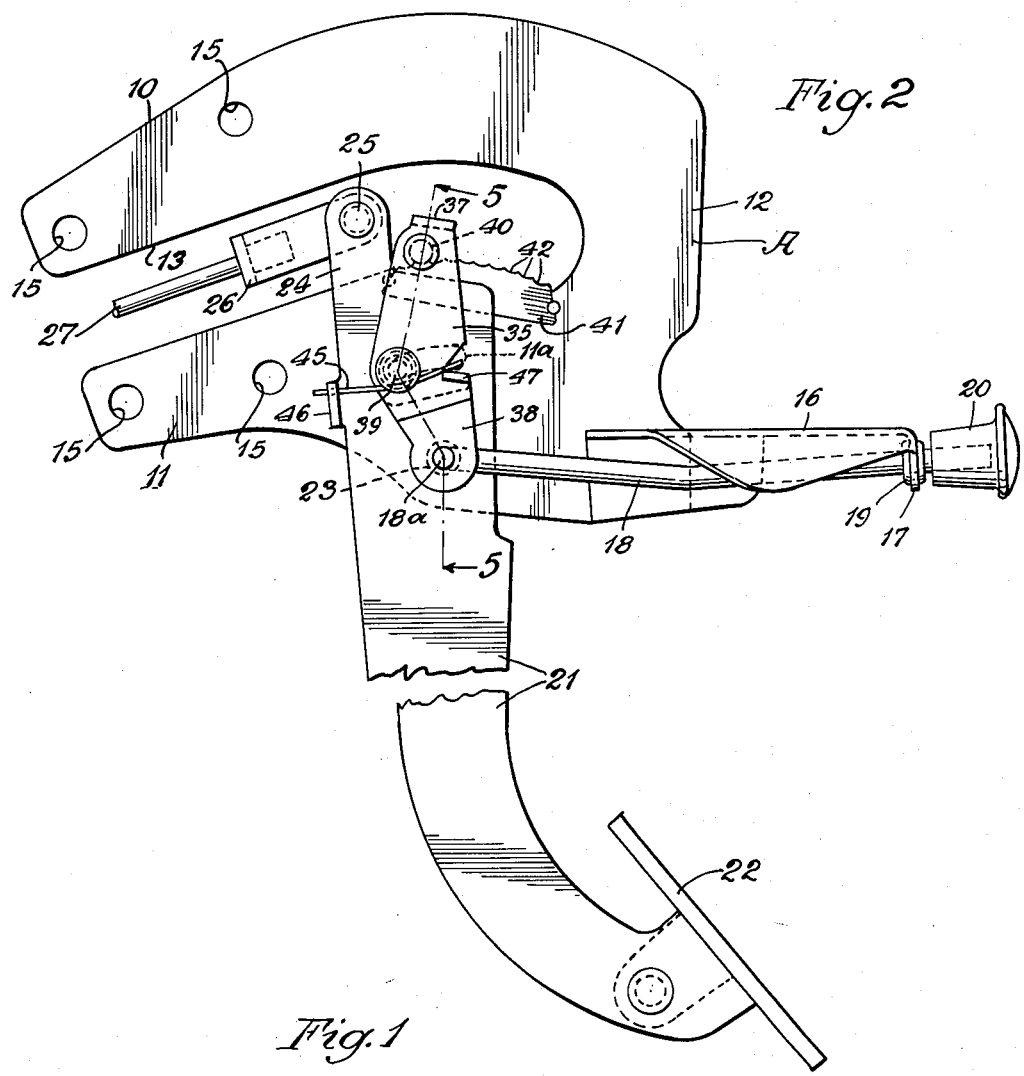
Figure 2 is a partial side elevation, on an enlarged scale, illustrating the manual and the pedal controls, and their direct connections.

Referring to the drawings, 1 generally indicates an automobile chassis having front wheels 2 and rear wheels 3. The operator of the vehicle will be taken to be sitting in a seat conventionally illustrated at 4. Any suitable bracket or support 5 is shown in Figure 4. It will be understood that the structure may be mounted on the car or on the dashboard, or by any other suitable means. The bracket 5 will be understood to be suitably connected to the vehicle, and its portion 6 may be secured, for example, to the body of the car forwardly of the front door, or to the dashboard, depending upon the specific design of the car. The bracket 5 is shown as having a rearwardly extending portion 7 to which the below described structure is secured.

A main plate, generally indicated as A in Figures 2 and 3, is suitably secured to the bracket 7 or to an equivalent support. The frame A is shown as having an upper member 10 and a lower member 11, the two being connected at their rear end by a connecting portion 12, and being separated by a species of slot or opening 13. It will be understood, of course, that the shape of the parts may be widely varied. The plate A may be secured to the bracket 7, for example, by any suitable bolts or securing members 14 which will be understood to pass through the apertures 15.

Secured to or forming part of the plate A is a rearwardly extending piece or support 16 which includes or has secured to it a bearing 17 in which a rod 18 is slidably mounted. The rod actually passes through a rubber eye 19 in the bearing portion 17, to prevent rattle. At its outer or rear end the rod 19 is provided with a manual control member 20.

Figure 1:
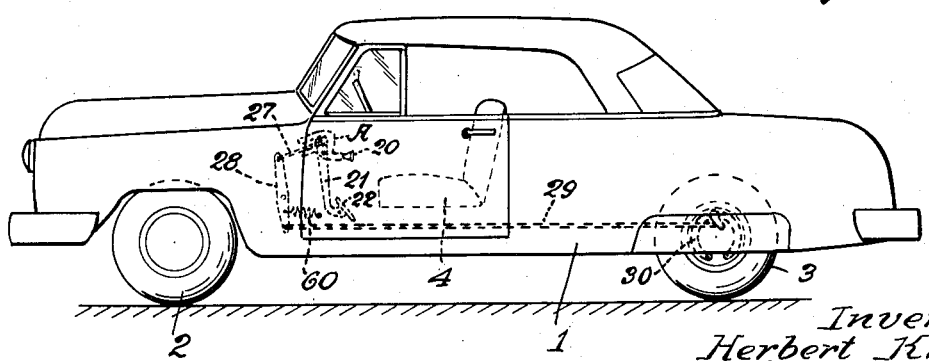
Figure 1 illustrates, somewhat diagrammatically, a vehicle including the brake control of the present invention.

21 is a brake lever for foot operation. Shown at its bottom is any suitable foot pedal or foot engageable element 22, the details of which do not, of themselves, form part of the present invention. The brake lever 21 is pivoted to the lower member 11 of the plate A, as at 23. As will be clear from Figure 5, the lever 21 may be formed of two parts which move in unison about the pivot 23, as shown in Figure 5, the two side elements of the lever 21 being located at opposite sides of the plate A. It will be understood, therefore, that the operator, by pressing against the plate 22, can rotate the lever 21 about the pivot 23. The upper lever portion or portions 24 are connected at their upper end by a suitable pivot or transverse member 25 to which is pivoted the end member 26 of a rod 27 which extends to the rocking lever 28 of Figure 1, the opposite end of which may be secured to any suitable rod 29 to actuate the brake 30. It will be understood that the connections 28, 29 and 30 are merely diagrammatic, and that any suitable means for actuating the emergency brake of an automotive vehicle may be employed. Whereas a rod 27 is illustrated, any suitable flexible member may be employed.

It will be understood that when the operator presses against the plate 22, and the lever elements 21 rotate about the pivot 23, the rod or tension member 27 moves to the right, referring to the position of the parts in Figures 2 and 3, and this movement is suitably transferred to apply the brake, for example, the emergency brake of an automotive vehicle.

The present structure includes a latching or locking means for holding the brake applied and a readily operable release therefor. As shown, for example, in Figure 5, the U-shaped member is employed, including side elements 35 and 36, and the connecting top or loop 37. The side element 35 includes a downwardly extending portion 38, which is lacking from the opposite side 36. The two side elements 35 and 36 are pivoted to the levers or lever elements 21, as by the pin 39 which passes through a generally arcuate slot 11a in the portion 11 of the plate A. The parts are so proportioned that the pin 39 is free in the slot 11a and does not contact its edges. The U-shaped member thus formed carries an upper or locking pin 40 adapted to ride over or be engaged by serrations 42 in an abutment plate or element 41. For example, it may be a hardened piece or a separate piece secured to or set into or welded to the portion 11 of the plate A, as shown, for example, in Figures 2 and 3. The U-shaped member 35, 36, 37 serves as a species of locking dog, and is normally urged toward locking position, with the pin 40 in engagement with one of the serrations 42, for example, by the spring 45, one end of which engages an offset portion or ear 46 of one of the lever elements 21. The other end engages an abutment 47 on the member 35. It will be understood that when the operator presses against the plate 22, the parts are moved from the position of Figure 2 to the position of Figure 3, depending upon how much force is employed or is necessary to set the brake. Figure 3 actually illustrates the parts in brake-holding position, with the U-shaped dog 35, 36, 37 about to move from the full-line toward the final dotted-line locking position. The arrow of Figure 3 indicates the direction in which the log or latch is moved by the spring 45.

The relation of the pivot 39 and the axis of the pin 40 is such, in relation to the pivot 23, that the pin 40 can ride over the serrations of the plate 41 and drop into the furthest serration it can reach, into which position it is urged by the spring 45. When the dog is in the dotted-line position of Figure 3, it will be understood that it is effective to hold the levers 21 in the full-line position of Figure 3, with the brake held in fully applied position.

When the user wishes to release the brake, all that he has to do is to pull the knob 20 to the right, referring to the position of the parts as shown in Figures 2 and 3. The release control rod 18 is suitably secured to the downward extension 38 of the side element 35 of the above-described dog, as shown at 18a in Figure 5. Thus, when the operator pulls the rod 18 with sufficient force, he is able, manually, to overcome the pull of the spring 45, with the result that the dog and its locking pin 40 are moved to the position in which they are shown in Figure 2. All that is necessary is to release the pin 40 from the serration in which it is seated, the result then being that the whole structure snaps to the release position of Figure 2. This final snap action results from any suitable spring structure associated with the brakes to be actuated. A suitable spring for the purpose is diagrammatically illustrated at 60 in Figure 1.

It will be realized that, whereas I have described and illustrated a practical and operative device, nevertheless, many changes may be made in the size, shape, number and disposition of parts without departing from the spirit of my invention. The description and drawings should, therefore, be taken as in a broad sense illustrative or diagrammatic, rather than as limited to my precise showing.

The use and operation of my invention are as follows:

To summarize the operation of the device, the operator can set the emergency brake by merely using a sufficient foot thrust against the plate 22. He then releases his foot thrust, but the above-described locking connection or dog holds the brake or brakes set, since the lever elements 21 are held in brake-actuating position by the dog 35, 36, 37 and the pin 40. All that the operator has to do to release the emergency brake is merely to pull on the knob 20 and thus on the rod 18. It will be understood that by the slight movement of the rod 18, the pin 40 is raised completely away from the serrations, so that the spring 60, or its suitable equivalent, operates to snap the parts to the full release position of Figure 2.

I claim:

1. In a locking and release mechanism for emergency brakes and the like, a main plate, a lock abutment on said plate having a generally arcuate frictional gripping face, a brake lever rotatably mounted on said plate, a locking lever rotatably mounted on said brake lever at a point between the axis of rotation of said brake lever and said gripping face and having a locking dog portion adapted to travel along said gripping face as said brake lever is rotated, yielding means effective to urge said locking portion toward said gripping face, and releasing means pivoted to said locking lever at a point beyond the axis of rotation of said locking lever from said locking portion and movably mounted on said plate.

2. The structure of claim 1, wherein said abutment constitutes a separate element removably secured to said plate.

3. In a locking and release mechanism for automobile brakes and the like, a main plate having a serrated abutment in normally fixed relation thereto, a brake lever rotatably mounted on said plate, a locking lever rotatably mounted on said brake lever between said abutment and said brake lever pivot and having a locking dog portion adapted to engage the serrations in said abutment, and yielding means effective to urge said locking portion toward said abutment.

4. The structure of claim 3, characterized by and including a release control member slidably mounted on said plate and pivoted to said locking lever adjacent its end beyond the axis of rotation of said locking means from said locking portion, said release member being positioned for movement along said plate in a direction to urge said locking portion away from said abutment.

5. In a locking and release mechanism for emergency brakes and the like, a main plate having a generally arcuate surface and a serrated abutment adjacent said surface in fixed relation thereto, a brake lever rotatably mounted on said plate and having a portion adapted to travel across said surface, a locking lever rotatably mounted on said brake lever at a point between said abutment and the axis of rotation of said brake lever and having a locking dog portion adapted to travel across said surface concurrently with said brake lever portion and to engage the serrations of said abutment, yielding means operably connected to said brake lever and said locking lever and adapted to urge said locking portion toward said abutment, and a release control member slidably mounted on said plate and pivoted to said locking lever at a point beyond the axis of rotation of said locking lever from said locking portion whereby movement of said release control member is effective to urge said locking portion away from said abutment.

References Cited in the file of this patent

UNITED STATES PATENTS

| | | |
|---|---|---|
| 2,308,898 | Skareen | Jan. 19, 1943 |
| 2,467,557 | Jandus | Apr. 19, 1949 |

FOREIGN PATENTS

| | | |
|---|---|---|
| 454,377 | Canada | Feb. 1, 1949 |